US005473883A

United States Patent [19]

Naudet

[11] Patent Number: 5,473,883

[45] Date of Patent: Dec. 12, 1995

[54] COMPRESSOR TURBOJET ENGINE WHOSE ROTOR HAS A MOVABLE UPSTREAM STAGE

[75] Inventor: Jacky S. Naudet, Bondoufle, France

[73] Assignee: Societe Nationale d'Etude et de Construction de Moteurs d'Aviation "Snecma", Paris, France

[21] Appl. No.: 332,784

[22] Filed: Nov. 1, 1994

[30] Foreign Application Priority Data

Nov. 3, 1993 [FR] France ........................ 93 13043

[51] Int. Cl.$^6$ ........................ F02C 1/06; F02C 7/20; F02G 3/00

[52] U.S. Cl. ........................ 60/39.161; 60/39.31

[58] Field of Search ........................ 60/39.161, 39.31

[56] References Cited

U.S. PATENT DOCUMENTS

| | | | |
|---|---|---|---|
| 4,744,214 | 5/1988 | Monsarrat et al. | 60/39.161 |
| 5,220,784 | 6/1993 | Wilcox | 60/39.31 |
| 5,224,341 | 7/1993 | Munroe et al. | 60/39.31 |
| 5,307,623 | 5/1994 | Antuna et al. | 60/39.31 |

FOREIGN PATENT DOCUMENTS

| | | | |
|---|---|---|---|
| 2650338 | 2/1991 | France . | |
| 2674569 | 10/1992 | France . | |
| 1275836 | 8/1968 | Germany | 60/39.31 |
| 1808121 | 5/1970 | Germany . | |
| 233433 | 10/1944 | Switzerland . | |
| 1054031 | 1/1967 | United Kingdom . | |

*Primary Examiner*—Richard A. Bertsch
*Assistant Examiner*—Howard R. Richman
*Attorney, Agent, or Firm*—Oblon, Spivak, McClelland, Maier, & Neustadt

[57] ABSTRACT

Turbojet engine compressor . . . Its rotor (43) includes a movable end portion (45), such as a monoblock vaned disk able to be removed and replaced by a block. High and low pressure shaft lines (54) are formed into several portions to enable these operations to take place without having to dismantle the entire engine.

8 Claims, 5 Drawing Sheets

COMPRESSOR TURBOJET ENGINE WHOSE ROTOR HAS A MOVABLE UPSTREAM STAGE

FIELD OF THE INVENTION

The invention concerns a compressor turbojet engine whose rotor has a movable upstream stage.

BACKGROUND OF THE INVENTION

The vanes of compressor rotors are sometimes damaged, in particular when solid bodies enter the gas flow passage and strike these vanes. They must then be replaced. In ordinary engines, the vanes are mounted in the grooves of the rotor, from which they can be separately removed by eliminating the joints and plates which stop them from sliding in the grooves, and after having opened the housing of the stator of the compressor or after having separated it from an adjacent housing which extends it and after having brought the rotor out of the housing by a sufficient length so as to reveal the damaged vane.

Today, it is essential that the rotor is produced in the form of monobloc vaned disks (MVD) assembled together, or by incorporating these disks with ordinary rotors whose vanes are movable. In both these cases, there are certain advantages, as these disks, whose vanes thus form a single piece with the cylindrical or conical casing to which they are adjusted, have better resistance to both stresses and vibrations. They thus make it possible to lighten the rotor. But they need to be fully replaced if one of their vanes becomes damaged, this being acceptable when the production cost of a replacement disk is taken into consideration, but requires freeing the disk, not only from the housing of the stator, but also from the shaft lines it surrounds.

SUMMARY OF THE INVENTION

The invention more particularly relates to a compressor disposed in such a way so as to allow these replacements to be made. It results from the fact that monobloc vaned disks are in particular justified for the first stage of the compressor in question situated upstream, having regard to the the potential weight gain procured by these disks and which decreases downstream of the compressor. As this first stage is in particular exposed to objects ingested by the compressor, it shall be assumed that it is probable that several vanes of this first stage shall be replaced at one and the same time and that it then also easy to replace an entire disk than a series of conventionally-mounted vanes.

The compressor of the invention consists of a rotor and a stator, the rotor comprising a body and moving vanes linked to the body, the stator being composed of a stator housing and fixed vanes linked to the stator housing, the fixed and moving vanes being recombined into axially alternate stages, the turbojet engine comprising also at least one shaft line traversing the rotor body; or in addition the body consists of a monobloc vaned disk at the upstream end and another part to which the monobloc vaned disk is assembled by a centering seat and a fixing flange, the vaned disk bearing the moving vane stage most upstream on the rotor, the stator housing is assembled on another housing which it prolongs by means of a parting line immediately upstream of the monobloc vaned disk, and the shaft line comprises parts able to be separated and assembled by linking means situated upstream of the monobloc vaned disk.

The invention is first of all recommended to be used in a situation where the compressor is a high pressure compressor situated downstream of a low pressure compressor and upstream of two turbines, the shaft lines are concentric and amount to two, and the means for linking their parts are nuts.

BRIEF DESCRIPTION OF THE DRAWINGS

The invention shall now be described in more detail with the aid of the attached figures given by way of non-restrictive illustration on which.

DETAILED DESCRIPTION OF THE PREFERRED EMBODIMENTS

Figure 1:
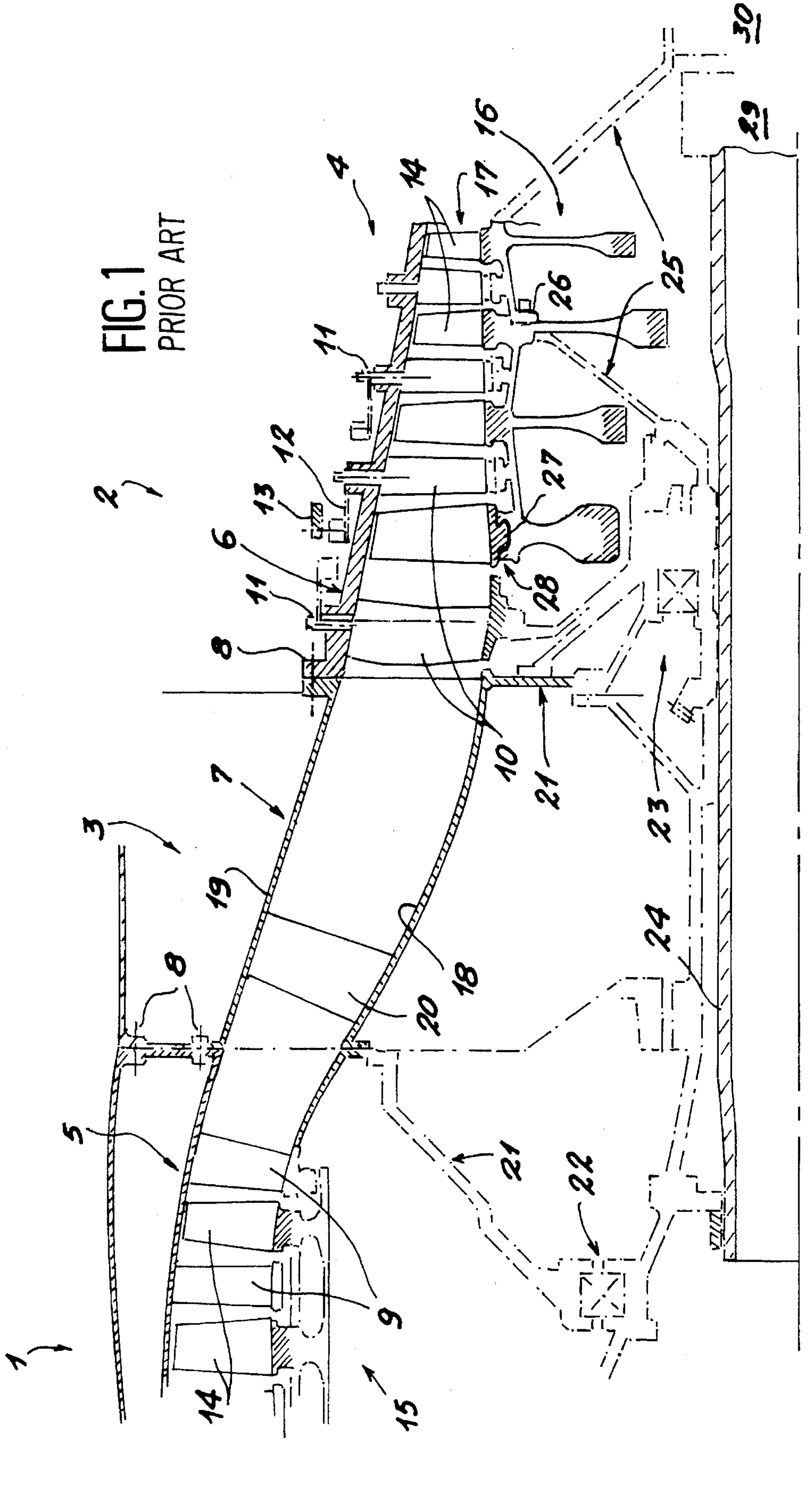
FIG. 1 PRIOR ART
FIG. 1 is an overall view of the compression zone of a turbo aero engine in accordance with previous designs.

FIG. 1 represents a conventional design of the prior art. The compression zone shown comprises a low pressure compressor 1 upstream of a high pressure compressor 2, and the two compressors 1 and 2 are separated by an intermediate zone 3. A stator, generally given the reference 4 and extending over the entire compression zone, firstly comprises a housing consisting of three extending portions 5, 6, and 7 respectively associated with the compressors 1 and 2 and the intermediate zone 3 and assembled together by bolts 8 making it possible to separate them. The portions 5 and 6 of the housing associated with the compressors 1 and 2 bear vanes; those 9 of the low pressure compressor 1 are rigidly secured, but those 10 of the high pressure compressor 2 are rotating and to this effect include a radial journal through the portion 6 of the rotor and which is connected to a connecting rod 12 joined by its other end to a control ring 13. More specifically, the vanes 9 and 10 are distributed into stages with a circular disposition and with certain cross sections of the compressors 1 and 2, and each control ring 13 is combined with a whole stage of vanes 10. The means able to move the control rings 13 to adjust the inclination of the vanes 10 according to the speed of the engine are conventional and shall not be shown on the drawing.

The vanes 9 and 10 respectively alternate with the moving vanes 14 of a low pressure rotor 15 and a high pressure rotor 16 which belong to the compressors 1 and 2 and are thus surrounded by the housing portions 5 and 6. The moving vanes are also regrouped into circular stages which alternate with those of the stator vanes 9 and 10 which, as opposed to the other vanes, shall therefore be called "fixed vanes", although the vanes 10 are able to rotate. A stage of fixed vanes 10 precedes the first stage of moving vanes 14 of the high pressure rotor 16 towards upstream, this stage being known as a "distribution stage" and the other stages of fixed vanes 10 as "rectification stages".

The propulsion gases are thus compressed by flowing into an annular passage 17 between the stator 4 and the rotors 15 and 16; the intermediate portion of the housing 7 includes an internal wall 18 connected to an external wall continuous with the portions 5 and 6 by radial braces 20 which extend through the passage 17. The internal wall 18 ensures continuity of the passage 17 between the rotors 15 and 16 and is connected by ribs 21 to at least two bearings 22 and 23, the first bearing being used to support a low pressure shaft line 24, the second one being used to support a high pressure shaft line 25. The shaft lines 24 and 25 are respectively fixed to the rotors 15 and 16 by bolts 26 and are used to have them driven by the respective turbines 29 and 30 situated more downstream of the engine. The designation "shaft line" is understood to mean the shafts or shaft portions as well as the adjoining parts, such as their bearings. The low pressure shaft line 24 is continuous and traverses the body of the high pressure rotor 16, and the high pressure shaft line 25 is formed of two separate portions fixed to the ends of this body. Nevertheless, it can be said that it "traverses" this body, which changes nothing in the invention as said line needs to be also dismounted so as to be able to move the high pressure rotor 16.

Access to the rotating vanes 14 of the high pressure rotor 16 is thus obtained by removing the bolts 8 joining the portions 6 and 7 of the housing and then by separating them. The rotating vanes 14 have feet 27 engaged in the corresponding grooves of the rotor 16 and into which said feet are retained by circular retainer rings covering the outlets of the grooves or similar means, such as flanges, many types of the latter having been proposed. They bear the reference 28.

Figure 2:
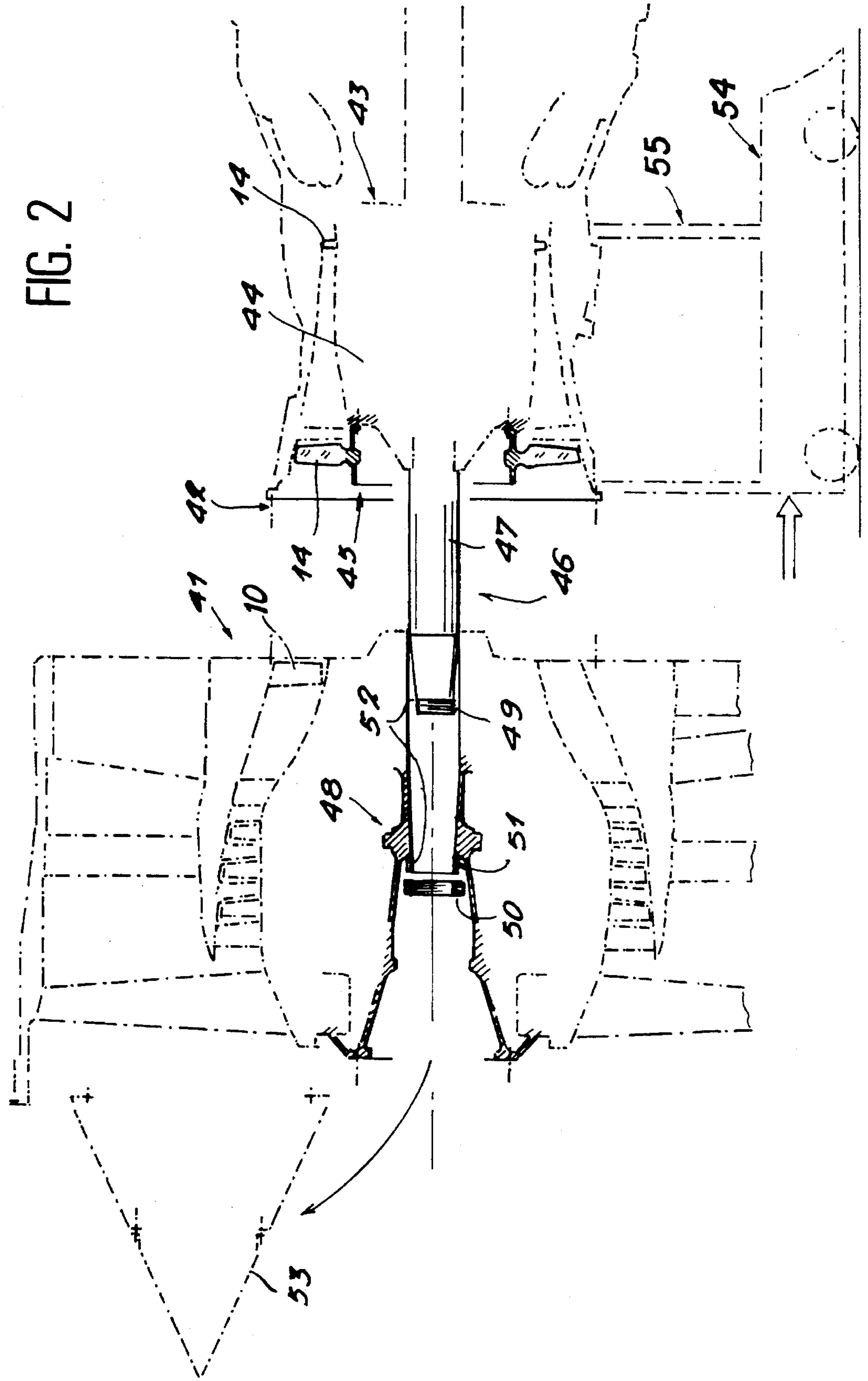
FIG. 2 is an overall view of the dismounting method of the invention.

The invention contains certain conventional details which shall remain valid for the embodiment of the invention now to be described and its variants, except when it shall be indicated otherwise or when a contradiction appears. Thus, FIG. 2 shows a low pressure compressor 41 and a high pressure compressor 42, but the rotor 43 of the latter is now divided into two portions: a main body 44, similar via its construction to the rotor 16 and which comprises in particular rotating vane stages connected to it in the same movable way by foot and groove mountings, and a monobloc vaned disk 45 situated upstream of the main body 43 and which bears only one stage of rotating vanes 14 formed of a single piece with the rest of the disk. The low pressure shaft line 46 is also divided and comprises a main shaft 47 which remains indirectly integral with the high pressure compressor 42 and which overlaps a shaft end 48 integral with the low pressure compressor 41. The main shaft 47 is engaged in a perforation of the shaft end 48 and goes past it (see also FIG. 3) by a threaded end 49 on which a nut 50 is screwed, and chucking is ensured when the nut 50 abuts against a shoulder 51 of the shaft end 48 and when the main shaft 47 and the end shaft 48 abut against each other by means of a pair of support bearings 52. It merely suffices to remove the conical fuselage 153 in front of the rotor of the low pressure compressor 41 to find the nut 50 and dismantle it, after which the main shaft 47 can be separated from the shaft end 48, provided that the stator is dismantled. One of the engine portions, one part of said portions being the main shaft 47, is then driven on a carriage 36 on which it is placed by a centering gauge 37. The other portion of the engine remains fixed to another centering gauge (not shown).

Figure 4:
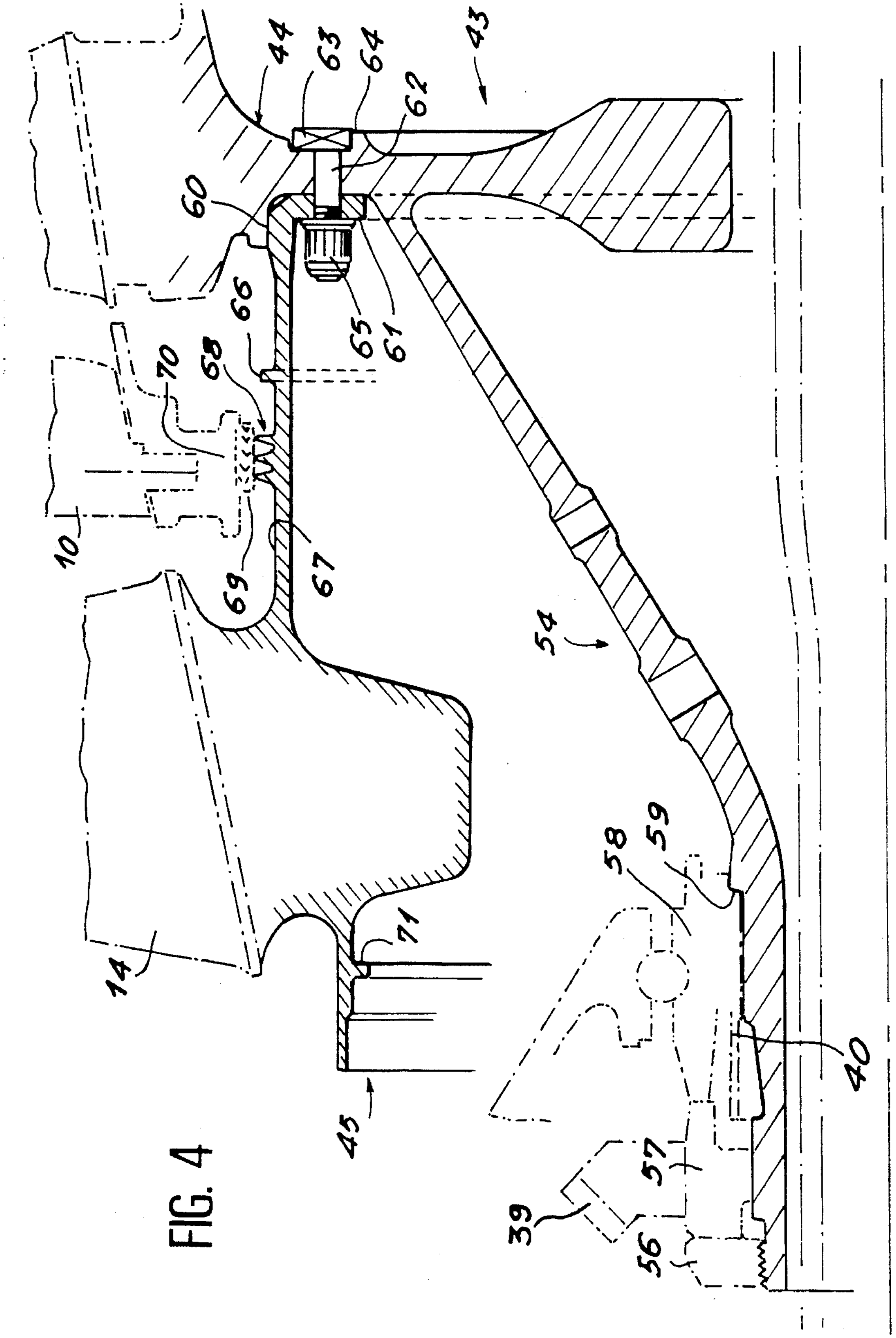
FIG. 4 is a partial view of FIG. 3, and FIGS. 5 and 6 represent two tools used for dismounting and mounting.

As best seen in FIG. 4, the main body 44 is secured to the high pressure shaft line 54 while the monobloc disk 45 is linked to the shaft line 54 only via the main body 44.

Figure 3:
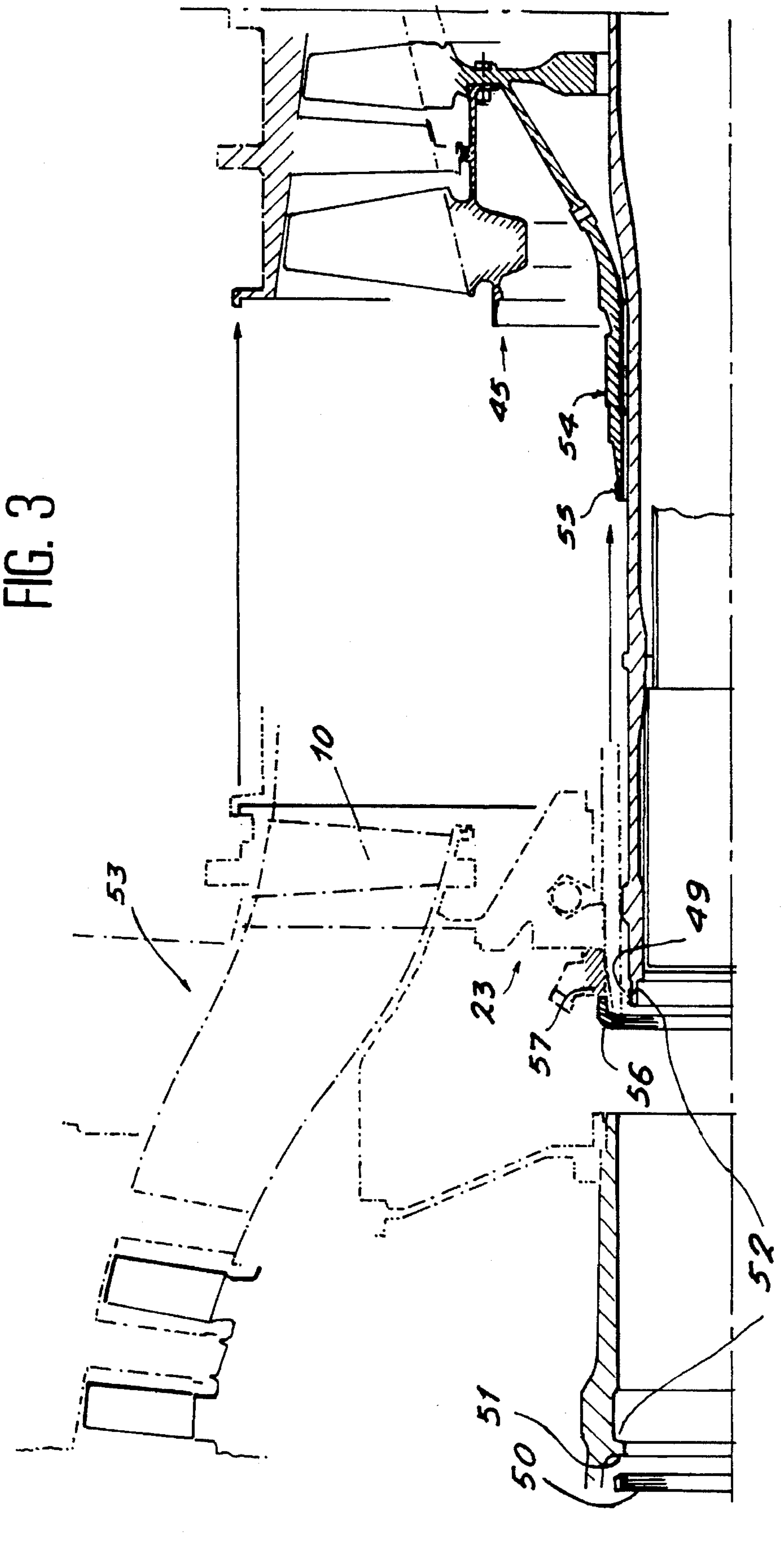
FIG. 3 is a detailed view of FIG. 2.

With reference to FIG. 3, the intermediate portion 53 of the housing differs from that 7 of the known embodiment since it solely bears the first stage of fixed vanes 10. The monobloc vaned disk is thus uncovered upstream when the portions 42 and 53 of the housing are separated. But it is still necessary to sever the high pressure shaft line 54 from its bearing 23. This is possible if the end of the high pressure shaft line 54 bears a threading 55 on which a nut 56 is screwed, the nut 56 tightening a ring-brace 57, possibly carrying a gear wheel for driving certain accessories of the engine, against the internal ring of the rolling bearing which forms the bearing. A large number of these power transmission gear wheels exist in aircraft engines and do not need any additional description. The one concerning the invention bears the reference 39.

This disposition is clearly visible on FIG. 4. The internal ring 58 during mounting abuts against the high pressure shaft line 54 by a pair of support surfaces 59 between which adjustment shims are able to slide. The high pressure shaft line 54 and the brace ring 57 bear grooves 40 enabling the latter to slide axially whilst being kept in the other directions. When the nut 56 is unscrewed, the brace ring 57 is easily removed from the high pressure shaft line 54. The internal ring 58 of the rolling bearing is mounted sliding on the high pressure shaft line 54.

The monobloc vaned disk 45 is assembled with the main body 44 of the high pressure rotor 43 by a circular centering bearing 60 mounted in a bearing with the same nominal dimension of the main body 44 and with tightened adjustment (H7p6, for example) so as to provide the rotor 43 with extremely good cohesion. Fixing is ensured by means of a flange 61 of the monobloc vaned disk adjacent to the centering bearing 60 and which abuts via one flat face against a flat surface of the main body 44. So as to complete the bolting required to fix the flange 61, screws 62 are selected whose head 63 is square and retained in the non-circular perforations of an internal face 64 of the main body 43 behind the zone by which the monobloc vaned disk 45 is assembled. With this construction, the rods of the screws 62 come out of the flange 61 upstream and it is relatively simple to screw nuts 65 into it so as to retain the flange 61 or, on the other hand, unscrew them so as to repair or replace the monobloc vaned disk 45, as the screws 62 are unable to rotate. However, they may be removed or replaced.

The monobloc vaned disk 45 includes counterweights in the form of a circular small ring 66 projecting outwardly onto a cylindrical sleeve 67 ended by the centering bearing 60 and the flange 61. When a new monobloc vaned disk 45 is assembled with the main body 44, interchangeability of equilibrium is guaranteed by virtue of a balancing of the independent monobloc vaned disk which is effected by recovering the small ring 66.

The sleeve 67 also bears the circular tongues 68 of a labyrinth joint, said tongues catching—according to a known disposition—in a layer of a soft or erodable material 69 crown-disposed in a retaining ring 70 of the fixed vanes 10 of the second stage from upstream; in this construction where the tongues 68 separate the small ring 66 from the mobile vanes 14, they need to be higher than the small ring 66 so that dismantling is possible. Finally, there is another small ring upstream of the rotating vanes 14 on the monobloc vaned disk. This is actually a tool holder 71 projecting inwardly, thus rendering easier extraction or replacement of the monobloc vaned disk.

Figure 5:
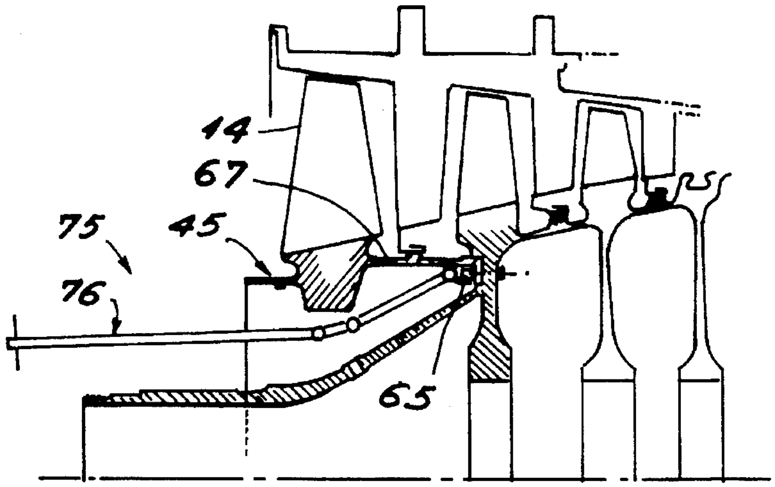
Figure 6:
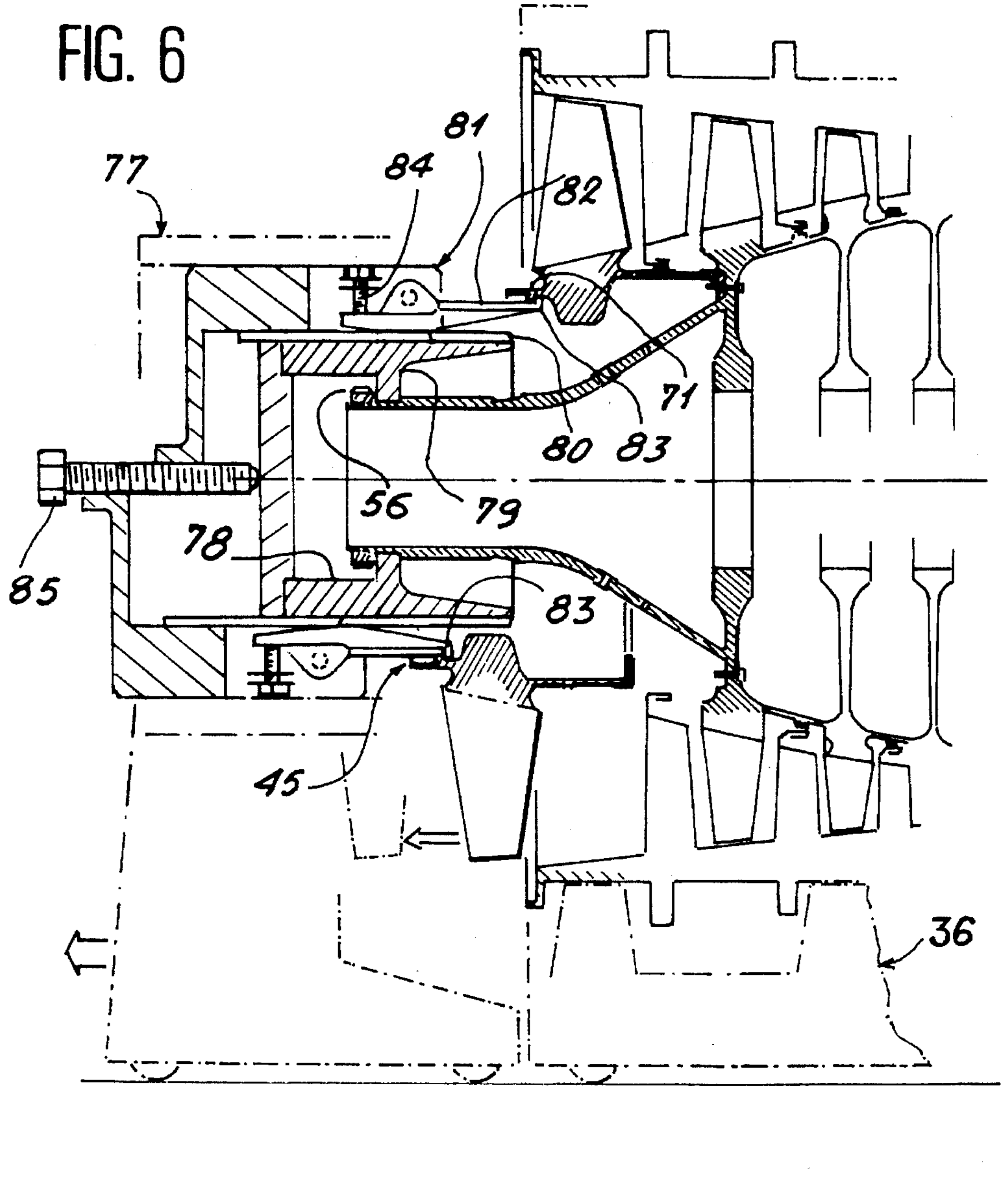

FIGS. 5 and 6 diagrammatically show the tools used. FIG. 5 shows a socket wrench 75 extended by an articulated arm 76 and able to be slid under the sleeve 67 so as to ensure the screwing and unscrewing of the nuts 65. A similar tool, namely a clamp spanner at the end of an articulated sleeve, may be used to reach the nut 56. It is introduced via the front of the engine by driving it into slots established through the fuselage 153 and the rib 21 of the bearing of the low pressure shaft line 24. These slots may be situated at locations (not shown) on FIGS. 2 and 3. As for FIG. 6, it shows the tools for extracting the monobloc vaned disk 45: an auxiliary carriage 77 draws alongside the main carriage 36 and it bears a tool constituted by a vice 78 whose jaws 79 clamp the end of the high pressure shaft line 54, thus centering the tool on the monobloc vaned disk 45. Moreover, the jaws 79 each bear a longitudinal rail 80 on which slides is a cursor 81 bearing a tilting lever 82. The end of the levers 82 bears a snug 83 for being engaged behind the tool holder 71. A device, such as a pressure screw 84 weighing on the other arm of the lever 82, is used to space apart the snugs 83. When the monobloc vaned disk 45 is blocked, the cursors 81 are pulled by means of a grasping mechanism which unites them and includes a screw 85 linked to the frame of the auxiliary carriage 77. The replacement of a monobloc vaned disk 45 is made in the same way by pressing the snugs 83 against the outer face of the tool holder 71. As in any normal case, a contraction resulting from cooling has then been obtained on the centering bearing 60 so as to enable it to be inserted easily.

Any mechanical or merely visual marking device may be provided to ensure that the monobloc vaned disk 45 is placed in an invariable angular position.

What is claimed is:

1. A turbojet engine including a compressor composed of a rotor and a stator, the rotor being composed of a body and mobile vanes linked to the body, the stator being composed of a stator housing and fixed vanes linked to the stator housing, the fixed and mobile vanes being grouped into axially alternate stages, the turbojet engine also including a shaft line traversing the body, the body being composed of a disk at an upstream end in a flow direction of gases flowing in the engine and another portion at which the disk is assembled by a centering bearing and a fixing flange, the disk comprising a stage of mobile vanes which is most upstream on the rotor, the shaft line being composed of separable portions and assembled by linking means situated upstream of the disk, wherein the disk is a monobloc vaned disk and the stator housing is assembled with another housing forming an extension of the stator housing at a parting line of said stator housing immediately upstream of the monobloc vaned disk, and the another portion of the body is secured to one of the portions of the shaft line and the disk is linked to the shaft line only through said another portion.

2. A turbojet engine according to claim 1, wherein the compressor comprises a high pressure compressor situated downstream of a low pressure compressor and upstream of two turbines, two of the separable portions of the shaft line are concentric and bolted together with a nut, a first of the separable portions which are bolted together being integral with the rotor of the high pressure compressor, the other of the separable portions which are bolted together being integral with a second rotor which is part of the low pressure compressor.

3. A turbojet engine according to claim 2, wherein the nut is disposed in such a way as to press a bearing of said shaft line against a shoulder of said shaft line.

4. A turbojet engine according to claim 3, including a brace ring spline-fitted around the shaft line and clamped between the nut and the bearing.

5. A turbojet engine according to claim 1, wherein the other housing bears a stage of fixed vanes situated upstream of the stage of mobile vanes of the monobloc vaned disk.

6. A turbojet engine according to claim 1, wherein the monobloc vaned disk comprises balancing masses.

7. A turbojet engine according reliefs to claim 1, wherein the monobloc vaned disk comprises engagable by extracting or mounting tools.

8. A turbojet engine according to claim 1, wherein the centering bearing is circular and the fixing flange has a flat face.

* * * * *